United States Patent
Rickelton-Abdi

(10) Patent No.: US 9,911,457 B2
(45) Date of Patent: Mar. 6, 2018

(54) SYSTEM AND METHOD FOR PROVIDING A SECURE CONTENT WITH REVOCABLE ACCESS

(75) Inventor: Cyril Rickelton-Abdi, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 946 days.

(21) Appl. No.: 12/284,803

(22) Filed: Sep. 24, 2008

(65) Prior Publication Data

US 2010/0077463 A1    Mar. 25, 2010

(51) Int. Cl.
*G06F 21/10* (2013.01)
*G11B 20/00* (2006.01)
(Continued)

(52) U.S. Cl.
CPC ........ *G11B 20/00862* (2013.01); *G06F 21/10* (2013.01); *G11B 20/00086* (2013.01);
(Continued)

(58) Field of Classification Search
CPC ..... H04N 21/42646; H04N 21/440209; H04N 29/06462; H04N 7/173; H04N 29/06476; H04N 29/08108; H04N 29/0651; H04N 29/06523; H04N 29/08954; G06F 3/0677; G06F 2212/2212; G06F 17/30; H04L 12/2498; H04L 41/509; H04L 12/2812; H04L 12/40104; H04L 29/06; H04L 29/08972; H04L 67/327; H04L 65/4084;
(Continued)

(56) References Cited

U.S. PATENT DOCUMENTS 5,982,891 A    11/1999  Ginter
7,036,736 B2 *  5/2006  Sarbaz et al. ............ 235/462.01
(Continued)

FOREIGN PATENT DOCUMENTS

JP    1998-11860    1/1998
JP    10-177554    6/1998
(Continued)

OTHER PUBLICATIONS

Marc A. Kaplan: "IBM Cryptolopes, SuperDistribution and Digital Rights Management" Dec. 30, 1996 <http://www.research.ibm.com/people/k/kaplan/cryptolope-docs/crypap.html>.
(Continued)

*Primary Examiner* — Malcolm Cribbs
(74) *Attorney, Agent, or Firm* — Farjami & Farjami LLP

(57) ABSTRACT

There is provided a method for use by a media player to provide access to a media content. The method comprises receiving a request from a user for playing the media content, prompting a user for an authorization code, receiving the authorization code from the user, transmitting the authorization code to an authentication server over a network, receiving a valid authentication message from the authentication server over the network if the authorization code is confirmed to be valid, transmitting the valid authentication message to a content server over the network, retrieving the media content from the content server over the network, wherein the media content incorporates an identification information associating the media content with the user.

18 Claims, 4 Drawing Sheets

(51) Int. Cl.
*H04L 29/06* (2006.01)
*G11B 20/10* (2006.01)

(52) U.S. Cl.
CPC .. *G11B 20/00152* (2013.01); *G11B 20/00195* (2013.01); *G06F 2221/0733* (2013.01); *G06F 2221/0737* (2013.01); *G11B 2020/10537* (2013.01); *G11B 2220/2541* (2013.01); *H04L 63/10* (2013.01)

(58) Field of Classification Search
CPC ........... H04L 2209/60; H04L 2209/603; H04L 2209/605; H04M 1/274516
USPC ................. 726/5, 26–33; 713/176; 386/260; 380/239–242
See application file for complete search history.

(56) References Cited

U.S. PATENT DOCUMENTS

| | | | |
|---|---|---|---|
| 7,643,637 B2* | 1/2010 | Venkatesan et al. | 380/268 |
| 7,747,864 B2* | 6/2010 | Fierstein et al. | 713/176 |
| 7,783,888 B2* | 8/2010 | Green | 713/176 |
| 7,882,367 B2* | 2/2011 | Tachikawa et al. | 713/193 |
| 8,060,389 B2* | 11/2011 | Johnson | 705/6 |
| 8,234,302 B1* | 7/2012 | Goodwin | G06F 21/10 707/783 |
| 8,863,239 B2* | 10/2014 | Lenoir | G06F 21/10 709/217 |
| 8,863,303 B2* | 10/2014 | Robert | G06F 21/10 713/172 |
| 9,002,750 B1* | 4/2015 | Chu | H04L 63/0838 705/55 |
| 9,202,210 B2* | 12/2015 | Raines | G06F 21/10 |
| 9,256,675 B1* | 2/2016 | Wiegering | G06F 17/30864 |
| 2002/0007456 A1* | 1/2002 | Peinado et al. | 713/164 |
| 2002/0078178 A1* | 6/2002 | Senoh | G06F 21/10 709/219 |
| 2002/0141582 A1* | 10/2002 | Kocher et al. | 380/201 |
| 2003/0040962 A1* | 2/2003 | Lewis | 705/14 |
| 2004/0021549 A1* | 2/2004 | Choi | G06F 21/10 340/5.8 |
| 2004/0088549 A1* | 5/2004 | Ukai | G06F 21/10 713/175 |
| 2004/0126095 A1* | 7/2004 | Tsumagari et al. | 386/95 |
| 2004/0130142 A1* | 7/2004 | Sarbaz et al. | 283/74 |
| 2004/0133794 A1* | 7/2004 | Kocher et al. | 713/193 |
| 2004/0187005 A1* | 9/2004 | Molaro | G06F 21/10 713/176 |
| 2004/0236588 A1* | 11/2004 | Millard et al. | 705/1 |
| 2005/0144641 A1* | 6/2005 | Lewis | 725/60 |
| 2005/0147379 A1* | 7/2005 | Cuttner | G11B 20/00086 386/245 |
| 2005/0154682 A1* | 7/2005 | Taylor | 705/71 |
| 2005/0175180 A1* | 8/2005 | Venkatesan et al. | 380/268 |
| 2005/0177740 A1* | 8/2005 | Athaide et al. | 713/189 |
| 2005/0198677 A1* | 9/2005 | Lewis | 725/87 |
| 2006/0041510 A1* | 2/2006 | Gagnon et al. | 705/51 |
| 2006/0250922 A1* | 11/2006 | Sasaki | 369/59.25 |
| 2006/0271158 A1* | 11/2006 | Olson | A61F 2/88 623/1.15 |
| 2006/0294385 A1* | 12/2006 | Hayashi | G06T 1/005 713/176 |
| 2007/0033419 A1* | 2/2007 | Kocher et al. | 713/193 |
| 2007/0043883 A1* | 2/2007 | MacDougall | G06F 9/541 710/11 |
| 2007/0143603 A1 | 6/2007 | Hadden | |
| 2007/0150887 A1* | 6/2007 | Shapiro | 717/174 |
| 2007/0150889 A1* | 6/2007 | Shapiro | 717/174 |
| 2007/0150890 A1* | 6/2007 | Shapiro | 717/174 |
| 2007/0150891 A1* | 6/2007 | Shapiro | 717/174 |
| 2007/0226492 A1* | 9/2007 | Peinado et al. | 713/164 |
| 2007/0283448 A1* | 12/2007 | Green | 726/28 |
| 2008/0002828 A1* | 1/2008 | Tachikawa et al. | 380/203 |
| 2008/0002854 A1* | 1/2008 | Tehranchi | G06F 21/10 382/100 |
| 2008/0005802 A1* | 1/2008 | Fierstein et al. | 726/27 |
| 2008/0028474 A1* | 1/2008 | Horne | G06F 21/16 726/27 |
| 2008/0037781 A1* | 2/2008 | Kocher et al. | 380/201 |
| 2008/0049935 A1* | 2/2008 | Kocher et al. | 380/201 |
| 2008/0086379 A1* | 4/2008 | Dion et al. | 705/14 |
| 2008/0101604 A1* | 5/2008 | Kocher et al. | 380/210 |
| 2008/0130886 A1* | 6/2008 | Kocher et al. | 380/201 |
| 2008/0133938 A1* | 6/2008 | Kocher et al. | 713/193 |
| 2008/0137848 A1* | 6/2008 | Kocher et al. | 380/201 |
| 2008/0141242 A1* | 6/2008 | Shapiro | 717/174 |
| 2008/0172335 A1* | 7/2008 | Cheng | G06Q 30/0277 705/51 |
| 2008/0271158 A1* | 10/2008 | Kamperman | 726/27 |
| 2009/0049301 A1* | 2/2009 | Hamid | G06Q 30/06 713/176 |
| 2009/0067671 A1* | 3/2009 | Alattar | G06T 1/0028 382/100 |
| 2009/0073598 A1* | 3/2009 | Yahata et al. | 360/71 |
| 2009/0144237 A1* | 6/2009 | Branam | G06F 21/31 |
| 2009/0235330 A1* | 9/2009 | Byun et al. | 726/4 |
| 2010/0077463 A1* | 3/2010 | Rickelton-Abdi | G06F 21/10 726/5 |
| 2010/0077486 A1* | 3/2010 | Qu | G06F 21/10 726/28 |
| 2010/0082478 A1* | 4/2010 | Van Der Veen | G06F 21/10 705/39 |
| 2011/0191859 A1* | 8/2011 | Naslund et al. | 726/27 |
| 2011/0238983 A1* | 9/2011 | Lotspiech et al. | 713/165 |

FOREIGN PATENT DOCUMENTS

| | | |
|---|---|---|
| JP | 10-191036 | 7/1998 |
| JP | 11-313175 | 11/1999 |
| JP | 2000-324329 | 11/2000 |
| JP | 2001-111971 | 4/2001 |
| JP | 2004-69791 | 3/2004 |
| JP | 2007-206850 | 8/2007 |
| JP | 2008-052396 | 3/2008 |
| JP | 2008-108113 | 5/2008 |
| KR | 2003-0041501 | 5/2003 |
| KR | 2003-0081878 | 10/2003 |

OTHER PUBLICATIONS

Hartung Et. Al.: "Multimedia Watermarking Techniques", IEEE. vol. 87, No. 7, Jul. 1, 1999.

* cited by examiner

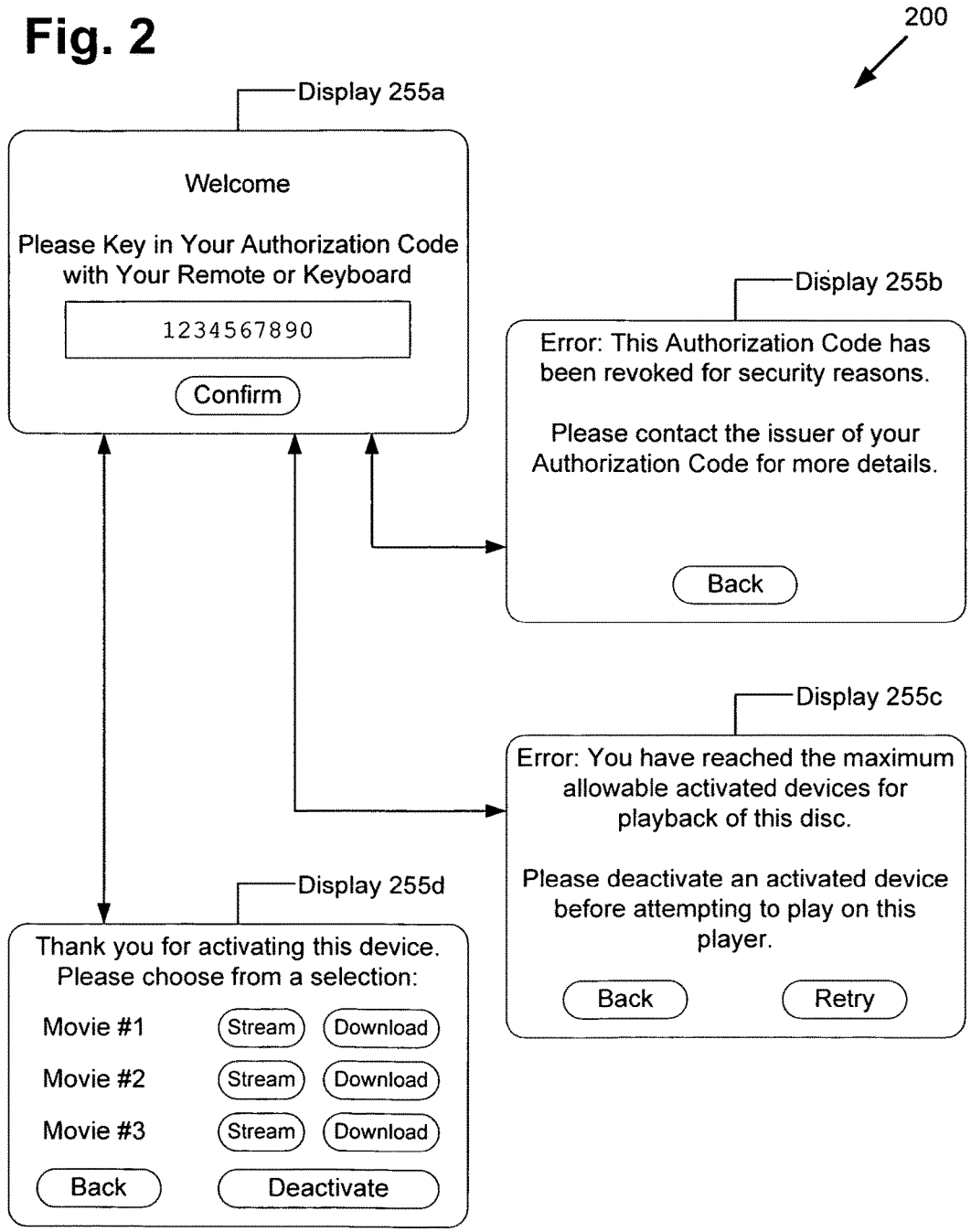

- Perceptible Watermark 372
- Imperceptible Watermark 371
- Video Layer 370

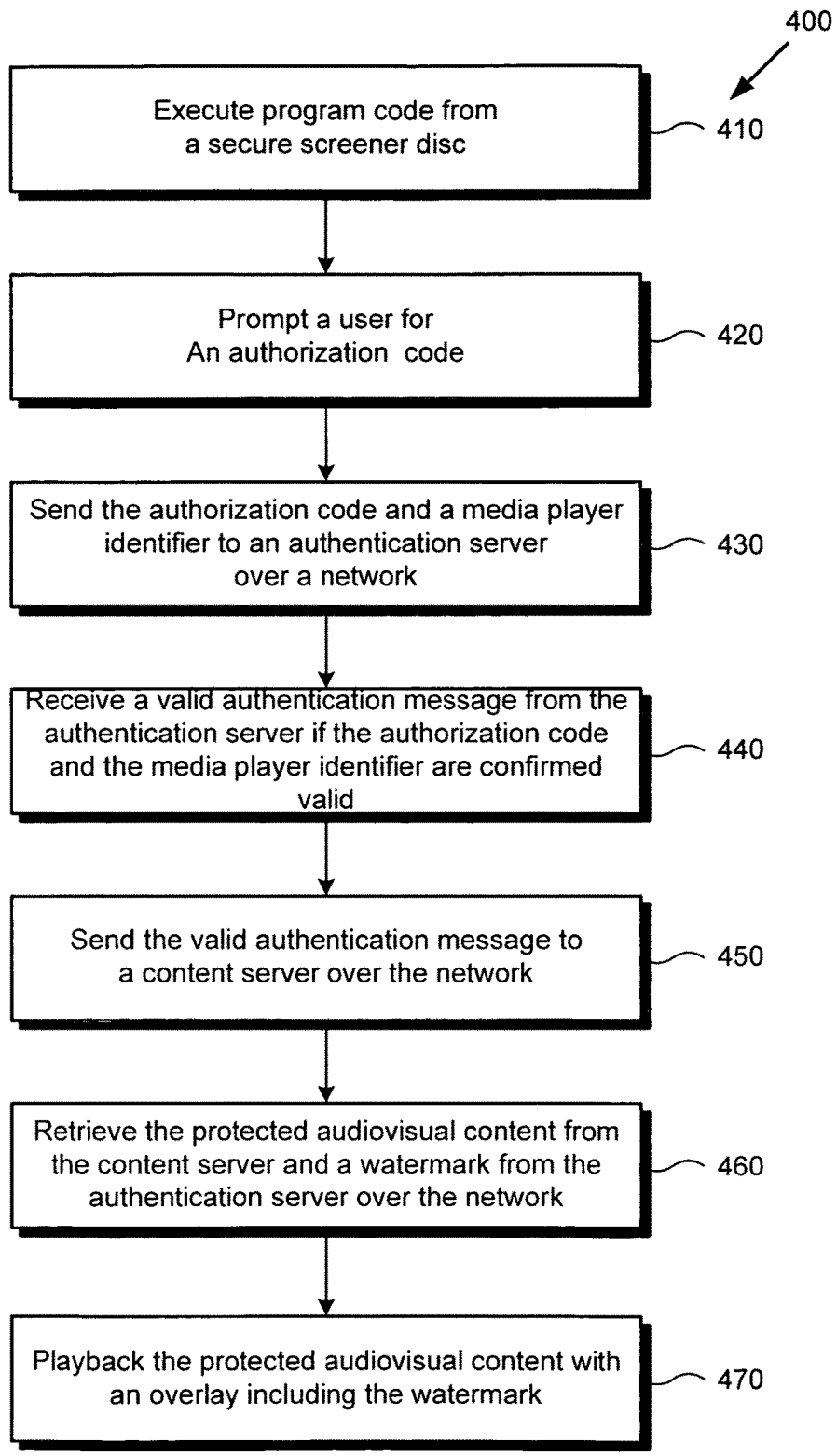

SYSTEM AND METHOD FOR PROVIDING A SECURE CONTENT WITH REVOCABLE ACCESS

BACKGROUND OF THE INVENTION

1. Field of the Invention

The present invention relates generally to computer systems and media content. More particularly, the present invention relates to systems for media content security and access.

2. Background Art

Within the entertainment media industry, there is often a need to provide advance or promotional copies of copyrighted material. Generating publicity and building consumer awareness are often key elements to a successful launch of any media product. For example, record companies might send promotional copies of new albums to selected publications prior to the release date, so that the reviews are available in the newsstands by the time the album arrives in retail channels. Similarly, in film and video production, screener discs are often provided to reviewers, judges and critics prior to the theatrical or retail release date, for reviews, ratings or awards purposes. Distributors might also receive these screener discs to evaluate the commercial merit of a possible distribution agreement.

However, at the same time it is vital to prevent such screener discs from leaking to the general public, which might render the promotional efforts thus far moot and siphon potential purchases or ticket sales due to resultant piracy. Often, reviewers, critics, and judges find it difficult to secure their advance copies from inquiring friends and family, who in turn distribute it to their network of peers in a chain reaction until the screener disc is widely available on the Internet or even duplicated in mass quantities by professional pirates. Once the content is widely available, it is difficult to mitigate the damage, since there is no easy method to restrict access.

The widespread leak of prerelease material without any means of containment is obviously a disaster that media content producers would prefer to avoid. Thus, a wide variety of methods to secure screener discs against unauthorized access and distribution are currently in use, but each method carries drawbacks that prevent adoption as an optimal solution. Expensive, inconvenient, or requiring sacrifices in audiovisual quality, the solutions currently in use are often unsatisfactory in many aspects.

One option to secure screener discs is to watermark the audiovisual content of each screener disc individually, so that in the case of a leak, analysis can at least reveal from which screener disc or party the leak might have originated. However, for each distinct recipient, the screener disc must be watermarked in a unique manner, turning a normally inexpensive disc replication step into a prohibitively expensive one. Since unique watermarks and discs must be generated for each receiving party, a single master disc may no longer serve as a simple and cost-effective duplication master.

Another option is to use a proprietary audiovisual playback solution that enforces Digital Rights Management (DRM) to prevent or mitigate leaks. The problem with this method is the proprietary nature of the solution, where each receiving party must have the proprietary playback equipment properly installed, which may be difficult if the screener discs need to be distributed to a large audience under tight deadlines. This method also typically relies on one single particular vendor for all the necessary equipment, which can be troublesome in the case of hardware failure, since only the single vendor can provide the necessary repairs and support. In addition, these proprietary systems tend to be more expensive than standard, easily obtained, off the shelf playback systems.

Yet another option is to deliver the content through a secure online delivery system. However, this method usually requires a personal computer for operation, and many people do not integrate their personal computers into their home theatres. Film directors and other creative individuals would prefer that audiences experience their creations with adequate audiovisual equipment to receive the full impact of their work. However, the typical personal computer is generally not up to task, usually featuring only a small LCD screen and tinny two-channel computer speakers. Without a delivery method that is easily integrated into a typical home theatre, which usually features a large display and a multi-channel audio system, the creative vision of the content producer might be sacrificed due to low quality video and audio playback.

As a last resort, the screener disc might be provided in an analog format such as a VHS tape, which by its analog nature degrades in quality as copies are made. Although this may deter some copying activity, the copy might still present adequate quality to deter a potential customer from purchasing the legitimate product, and the concerns of the content producer in preserving the audiovisual integrity of the content will remain ignored. Thus, the analog route may not help to stem piracy or to serve the original function of providing an adequate quality screener for reviewing audiences.

Accordingly, there is a need to overcome the drawbacks and deficiencies in the art by providing a system to allow secure distribution of screener discs that is cost effective and convenient but still provides for a high quality audiovisual experience.

SUMMARY OF THE INVENTION

There are provided systems and methods for providing a secure content with revocable access, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 presents a user interface flowchart for the secure delivery system, according to one embodiment of the present invention;

FIG. 4 shows a flowchart describing the steps, according to one embodiment of the present invention, by which a media player can access and play protected audiovisual content over a network by utilizing a secure content with revocable access.

DETAILED DESCRIPTION OF THE INVENTION

The present application is directed to a system and method for a secure content with revocable access. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
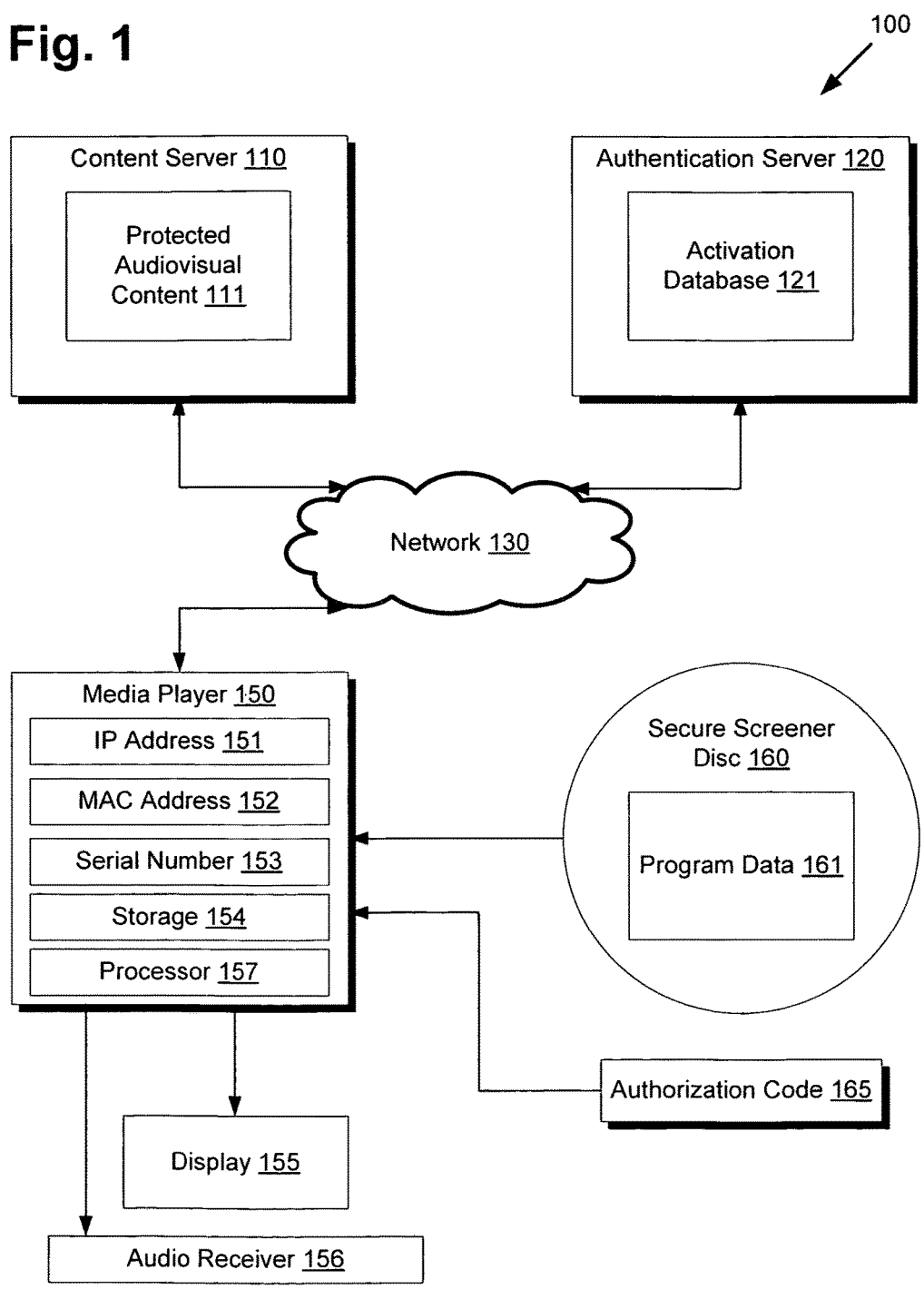
FIG. 1 presents a block diagram of a secure delivery system for use with a secure content with revocable access, according to one embodiment of the present invention.

FIG. 1 presents a block diagram of a secure delivery system for use with a secure content with revocable access, according to one embodiment of the present invention. Secure delivery system 100 includes content server 110, authentication server 120, network 130, media player 150, a secure content on. secure screener disc 160, and authorization code 165. Content server 110 includes protected audiovisual content 111. Authentication server 120 includes activation database 121. Media player 150 includes IP address 151, MAC address 152, decryption key 153, storage 154 and processor 157. Secure screener disc 160 includes program data 161. Network 130 provides data communications for content server 110, authentication server 120, and media player 150.

Content server 110 includes protected audiovisual content 111, which might comprise a movie or other programming intended for advance screening by a limited audience and not intended for the general public. For example, protected audiovisual content 111 might represent a movie entry in a film contest, intended for distribution only to the judges of the contest. Since the content is not intended for distribution to the general public, it is necessary to protect the content. In other embodiments, the content may be an audio content or a visual content, which is provided to an authorized person, such as purchaser of the content. Thus, content server 110 may not distribute protected audiovisual content 111 unless presented with proper credentials, which can include a valid authentication message from authentication server 120. Generally, encryption is the method used to protect content from indiscriminate distribution, the encryption often using the Advanced Encryption Standard (AES), which has found acceptance in content protection systems such as the Advanced Access Content System (AACS) for Blu-ray Disc. Although AES or AACS might be sufficient to secure protected audiovisual content 111, advances in computing power and cryptographic techniques might render alternative encryption systems preferable in the future.

Authentication server 120 includes activation database 121, which may contain validity status of authorization codes, watermark data corresponding to each authorization code, validity status of media player identifiers, and any other data necessary to carry out requested authentication functions. Although in FIG. 1, authentication server 120 is depicted as separate from content server 110, the two servers might be combined into a general-purpose server in alternative embodiments.

Network 130 provides data communications between connected devices, which in FIG. 1 includes content server 110, authentication server 120, and media player 150. Although network 130 could represent a proprietary closed network, network 130 may also be a publicly accessible network such as the Internet, providing a wide area of coverage for media players at diverse locations.

Media player 150 has a network connection, such as the connection to network 130 in FIG. 1, to communicate with content server 110 and authentication server 120. Thus, media player 150 can be a BD-Video Profile 2.0 (or future versions) compliant player having an Internet access support. In order to control the distribution of content stored on content server 110, it may be desirable to uniquely identify each connecting media player to enforce, for example, a maximum allowable number of media players for using a particular authorization code. Although a simplified system might only allow one media player per authorization code, a more flexible system might allow additional media players to use the same authorization code, so that a viewer can view secure screener disc 160 at different locations with different players. For example, a judge of the film festival might wish the flexibility of viewing the movie at home, at his office, or on a portable media player. To accommodate this wish, media player 150 needs to be uniquely distinguishable from other media players.

For media player 150 to be distinguished from other media players by authentication server 120, media player 150 might generate an identifier distinct from other players. Standard and guaranteed available network identifiers such as Internet Protocol (IP) address 151 and Media Access Control (MAC) address 152 might adequately identify media player 150, but these identifiers do not always strictly identify the same connected device due to several limitations. For example, a single IP address may point to multiple devices because of network translation, a common technique used by many network routers. Internet Service Providers might also employ techniques such as proxies and dynamic address assignment, leading to constantly changing IP addresses. Determined individuals might modify their Internet packets to change the apparent IP address. In addition, although the MAC address is intended to be unique for each device, the MAC address is nevertheless easily changed. Thus, neither the IP address nor the MAC address forms an immutable relation to a particular media player.

Thus, an additional or alternative piece of data might be helpful in further identifying media player 150. If media player 150 is an AACS compliant player, such as a Blu-ray Disc player, it will carry a model-specific decryption key after being approved by the AACS Licensing Administrator (LA). This decryption key at least differentiates between different player models, but is unsuitable for differentiating between different players of the same model, which may commonly occur if a particular player model is popular. Thus, if media player 150 supports querying of additional player specific information such as serial number 153, there might be a greater assurance of the uniqueness of identified media player 150.

Depending on the design of media player 150, storage 154 might be provided for storing user and downloaded content. This may allow the viewer the flexibility of downloading a movie and choosing a convenient time later to view the movie. If, however, storage 154 is limited in capacity or omitted altogether, downloading audiovisual content of any non-trivial size might be impossible. In this limited hardware scenario, real-time on-demand streamed content might serve as a substitute for downloaded content or secure screener disc 160.

Media player 150 includes output devices for video and audio, which are provided by display 155 and audio receiver 156, respectively. Display 155 might comprise a high-definition television (HDTV) or another High-bandwidth Digital Content Protection (HDCP) compliant display such as a LCD monitor. Display 155 can also present a user interface for interaction with the user, further detailed with FIG. 2 below. Audio receiver 156 might comprise a surround sound receiver capable of receiving and decoding multiple channels of audio and amplifying the multi-channel audio to multiple speakers placed in the surrounding environment. Although FIG. 1 depicts display 155 and audio receiver 156 both directly connected to media player 150, they might also be connected in a daisy-chain pass-through fashion, using for example a series of High-Definition Multimedia Interface (HDMI) cables capable of transporting both video and audio. In this case, media player 150 might first connect to audio receiver 156, which decodes the audio and also passes the video signal to display 155. Although HDMI cables are a commonly used interconnect, alternative interconnects for audio and video such as DisplayPort or some other future standard might also be used. Alternatively, media player 150 might be integrated with display 155 as a single unit, which might be the case for a combination Player/HDTV or a portable computer with an internal media drive.

Secure screener disc 160, including program data 161, is one of the components that allows the viewer to initiate the process of viewing protected audiovisual content 111. Secure screener disc 160 does not itself contain any video data, since it will be relying on network 130 for authentication and downloading of content. Thus, secure screener disc 160 can be treated as a generic activation disc that allows access to an interface for downloading protected audiovisual content 111.

Since the same secure screener disc 160 might be provided to multiple parties, authorization code 165 provides an additional piece of data that identifies a particular party. Authorization code 165 might comprise a string of alphanumeric characters, or just numeric characters for ease of entry through an input device with limited keys such as a remote control. Authorization code 165 should be generated in advance and stored within activation database 121, and then provided to an associated party in a manner that discourages third party copying. For example, a scratch card with the authorization code under an opaque removable layer might be utilized, as commonly used for prepaid point cards. This scratch card might be provided in person or sent via mail or some other delivery carrier. Alternatively, network 130 might provide a secure distribution channel for authorization code 165, such as through encrypted e-mail or by Hypertext Transfer Protocol over Secure Socket Layer (HTTPS). Transfers of authorization code 165 might further include a digital signature for identity verification of the viewing party.

Now, FIG. 2 presents a user interface flowchart for the secure delivery system, according to one embodiment of the present invention. User interface flowchart 200 includes display 255*a*, display 255*b*, display 255*c*, and display 255*d*, each display representing a possible configuration of display 155 from FIG. 1. From display 255*a*, it is possible to transition to display 255*b*, display 255*c*, display 255*d*, or another user interface state not depicted in FIG. 2. Similarly, from display 255*b*, display 255*c*, and display 255*d*, it is possible to return to display 255*a* by selecting the "Back" button or using some other means of navigating backwards, such as a back button on a remote control or keyboard.

Display 255*a* depicts a welcome screen prompting a user to enter in an authorization code. This screen might be presented immediately after secure screener disc 160 is inserted into media player 150 in FIG. 1. The program for presenting this interface might be embedded within program data 161 in FIG. 1, or it could reside on a remote server such as authentication server 120, with secure screener disc 160 merely providing access to the interface hosted on that remote server. For example, secure screener disc 160 might access a particularly constructed Uniform Resource Locator (URL) that points to a remotely hosted web-based user interface. Once a user enters an authorization code, "123456790" in FIG. 2, and selects the "Confirm" button, the user interface can transition to a number of different states depending on the results from authentication server 120.

Display 255*b* might be shown if a problem with the authorization code caused it to be invalidated automatically or by the initiative of an administrator. For example, the authorization code might have a validity period automatically expiring the authorization code past a certain date. Using the film contest example, the validity period might end on the day of the associated awards ceremony, for example. Alternatively, an administrator might manually issue an invalidation to address particular contingencies, such as a potentially lost or stolen authorization code and/or secure screener disc. For example, if an authorization code is sent via courier and lost in transit, the particular authorization code could be invalidated to protect it from being used by an unauthorized third party. By invalidating the associated authorization code, any individual or set of secure screener discs can thus be instantly revoked.

Display 255*c* might display if the maximum allowable number of media players for a particular authorization code is in effect. For example, there might be a limit of three simultaneously activated media players at any point in time, and display 255*c* might appear if a user attempts to activate a fourth media player. Thus, until an activated media player is deactivated, additional media players cannot use the same authorization code. The number limit might be adjusted to balance the competing interests of multiple location playback flexibility versus enhanced security against unauthorized viewing. Additionally, the number limit might be adjusted on a case-by-case basis, if an individual has special requirements necessitating a higher maximum than an average user. Further, in some embodiments, an additional number limited may be included to limit the number of times the content may be viewed.

Display 255*d* might display if authentication server 120 from FIG. 1 finds no issues with the provided authorization code, thereby activating the associated media player and allowing access to the protected content. As display 255*d* illustrates, the protected content could comprise multiple discrete selections, and provide different options for delivery, such as real-time streaming or download for future viewing. Additionally, an option to deactivate the associated media player is given, so that if a user reaches a maximum media player limit, the old media player can be deactivated and a new desired media player can be activated.

Figure 3A:
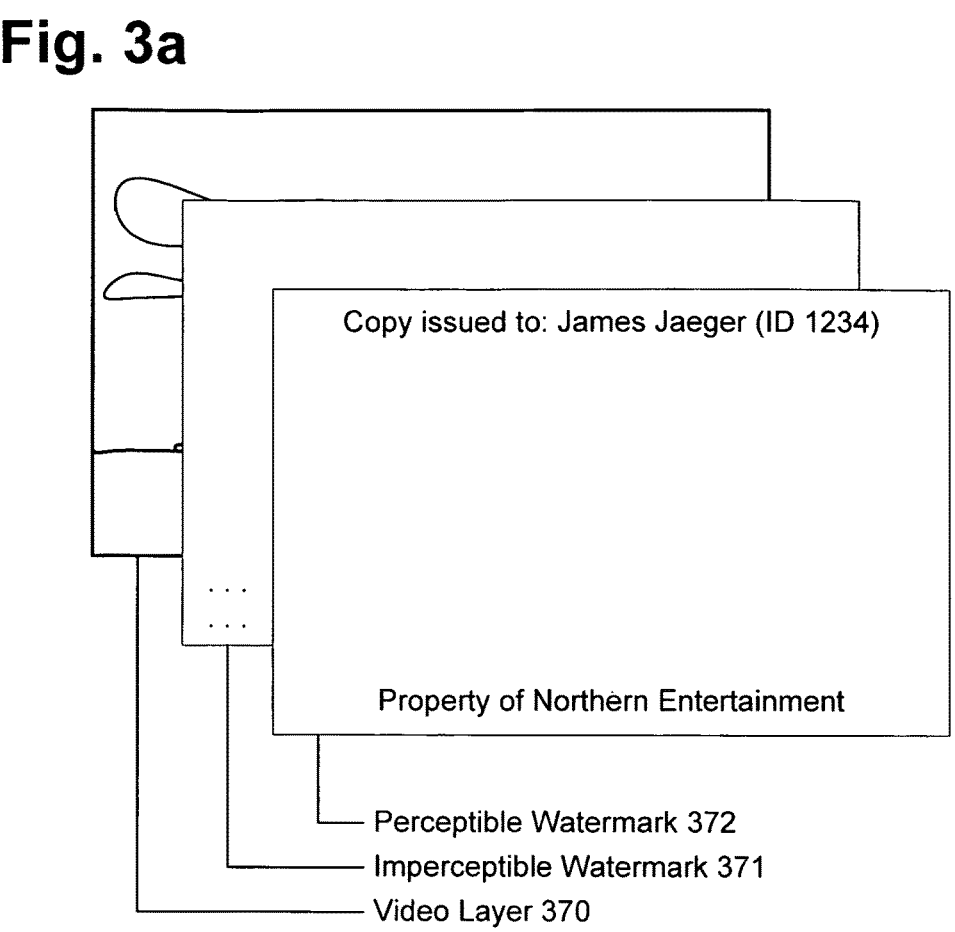
FIG. 3a and FIG. 3b present depictions of a video frame as played by a media player of the secure delivery system, according to one embodiment of the present invention.
Figure 3B:
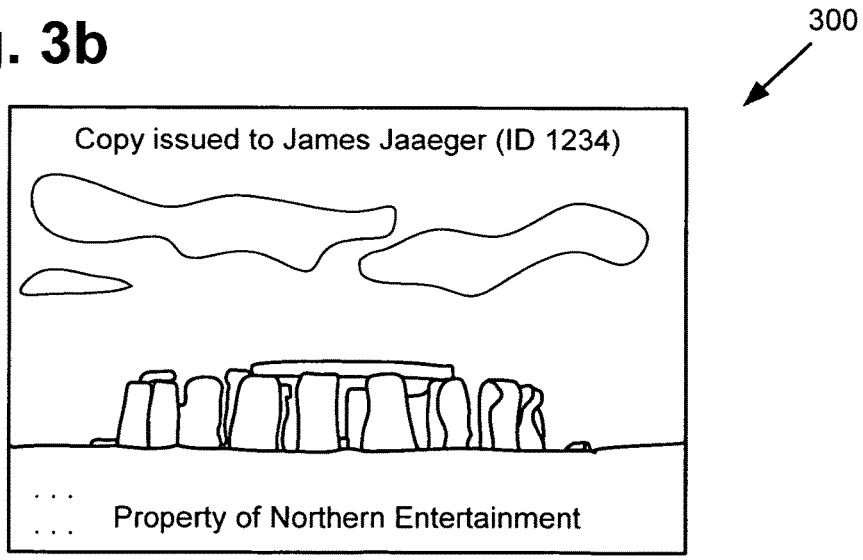

Once a user selects content to view and begins playback, video frames composed similarly to the expanded view in FIG. 3*a* might be shown on display 155 of FIG. 1. FIG. 3*a* presents an expanded depiction of a video frame as played by a media player of the secure delivery system, according to one embodiment of the present invention. Video frame 300 comprises video layer 370, imperceptible watermark 371, and perceptible watermark 372. Video layer 370 contains a frame of the actual video content from protected audiovisual content 111 of FIG. 1. However, overlaid on top of this video layer, additional watermark layers serve to deter unauthorized distribution and provide forensic source evidence in case of a leak. Authentication server 120 might generate and store these watermark layers in activation database 121, so that watermarks can be associated to the correct authorization codes if needed for the leak source purposes. Authentication server 120 can then provide the watermark layers to media player 150, where the video stream can be composed with the watermark layers using real-time video overlays. When the video overlays are composited together, the video frame may look similar to video frame 300 of FIG. 3*b*, except that imperceptible watermark 371 may be less visually prominent.

Imperceptible watermark 371, as shown in FIG. 3*a*, may be mostly transparent, except for a pattern of dots. This pattern of dots might be arranged in a precise fashion at particular defined times as well as X,Y coordinates within protected audiovisual content 111 of FIG. 1, but configured in such a manner that a human eye under normal viewing conditions will find the patterns difficult to detect. However, with the aid of machine-assisted image processing, the patterns can be detected. By embedding this imperceptible watermark, data concerning the distribution of the content, such as the authorization code, can be stealthily embedded within the actual video frames. This information may be useful for tracking and isolating possible leak sources. Although dots are given as an example, other methods of imperceptibly embedding data within a video frame could be used as well, such as subtly modifying certain color shades at particular points in time, or varying the brightness of the screen in a predefined manner.

Perceptible watermark 372, as shown in FIG. 3*a*, comprises visible identification information which functions as a deterrent against casual copying. As shown in FIG. 3*a*, visible text is overlaid identifying the party associated with the authorization code, which is "James Jaeger (ID 1234)" in this case. Additionally, "Property of Northern Entertainment" identifies the copyright holder and conveys to the viewer that the copyright owner may pursue her rights if unauthorized distribution occurs. These text overlays might change size or font, move around the screen, and otherwise not remain stationary to prevent a simple blackout or blockage of the overlays. Additionally, the movement of the text may help prevent image retention where the particular display technology may be susceptible, such as plasma television.

For watermark data representation, a variety of techniques might be used, such as scripting metadata, a separate video track, or a series of images with transition information. To prevent the possible reverse engineering of the watermark data, it might be stored only in a temporary memory of media player 150, encrypted and protected in storage 154, or otherwise obfuscated and made difficult to analyze. Once a particular data representation is selected, a corresponding implementation method can be coded. BD-J, or Blu-ray Disc Java, can be used to programmatically implement overlay support for secure screener discs stored in the Blu-ray disc format. Thus, Java code written to handle the specific chosen data representation can be inserted into program data 161 of FIG. 1. A high-level framework based on BD-J might be utilized as well. Alternatively, authentication server 120 or content server 110 might preassemble the composite frames if media player 150 lacks the ability to composite frames on the fly. Preassembling the overlays can also circumvent sending the watermark data to media player 150, further hardening the watermarks against reverse engineering.

FIG. 4 shows a flowchart describing the steps, according to one embodiment of the present invention, by which a media player can access and play protected audiovisual content over a network by utilizing a secure content with revocable access. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe one embodiment of the present invention, other embodiments of the invention may utilize steps different from those shown in flowchart 400. Processor 157 of media player 150 is configure to execute 410 through 470.

Continuing with the film contest example, assume that an indie film production company, "Northern Entertainment," has finished filming their newest work, "The Tetrahedron," and wants to distribute the work to the judges of the film contest. Furthermore, one of the film judges is "James Jaeger," with an ID number of "1234." Northern Entertainment wants to provide James with a secure screener disc 160 and an authorization code 165 such that James is enabled to view "The Tetrahedron." Thus, an administrator will enter the information for James and Northern Entertainment in activation database 121, linked to authorization code 165. For the purposes of the example, authorization code 165 might represent the string of digits "123456790" as shown in FIG. 2.

In preparation for providing James with the necessary items to view the "The Tetrahedron," a few steps should be accomplished first. First, the raw movie data for "The Tetrahedron" needs to be encoded into a suitable format, such as H.264 encoded video and Dolby Digital audio. Different sets of encodes might be generated to accommodate different download speeds, such as for example providing a large high quality download and a lower quality real-time stream to accommodate slower network connections. Next, the encoded videos should be encrypted to provide protection against indiscriminate copying and playback. After these steps are completed, the videos can be stored on content server 110 as protected audiovisual content 111. At this point, the environment is sufficiently configured to confidently provide James with secure screener disc 160 and authorization code 165.

Referring to step 410 of flowchart 400 in FIG. 4 and secure delivery system 100 of FIG. 1, step 410 of flowchart 400 comprises media player 150 executing program data 161 from secure screener disc 160 or a computer readable medium. Before this step can occur, James needs to insert secure screener disc 160 into media player 150 so that program data 161 can be read. Once program data 161 is read, processor 157 in media player 150 can begin execution of the code in program data 161, allowing James to begin the process of accessing and viewing "The Tetrahedron" from Northern Entertainment.

Referring to step 420 of flowchart 400 in FIG. 4 and secure delivery system 100 of FIG. 1, step 420 of flowchart 400 comprises media player 150 prompting James for authorization code 165. This prompt might be displayed on display 155, and appear similar to display 255*a* in FIG. 2. An input device such as a remote control or a keyboard might be used to accept input of authorization code 165 from James.

Referring to step 430 of flowchart 400 in FIG. 4 and secure delivery system 100 of FIG. 1, step 430 of flowchart 400 comprises media player 150 sending authorization code 165 from step 420 and a media player identifier to authentication server 120 over network 130. As previously discussed, the media player identifier could be a number of different data permutations that attempt to uniquely identify media player 150. By using all of the available identifiers, IP address 151, MAC address 152, and serial number 153 might be combined into a single media player identifier. Authentication server 120 might also allow for a certain amount of flexibility in interpreting the media player identifier. For example, some variation might be allowed for IP address 151 since most users will have a dynamically changing address. Additionally, Internet Service Providers (ISPs) may reassign IP addresses and route through proxies without any action from the user.

Referring to step 440 of flowchart 400 in FIG. 4 and secure delivery system 100 of FIG. 1, step 440 of flowchart 400 comprises media player 150 receiving a valid authentication message from authentication server 120 over network 130 if authorization code 165 and the media player identifier from step 430 is confirmed valid. Authentication server 120 might therefore consult activation database 121 to check if authorization code 165 exists and has not been revoked, and whether the number of activated players exceeds a certain associated threshold. The media player identifier is thus used to differentiate between unique activated players, helping to enforce the maximum activated players limit.

If authorization code 165 is still valid, display 255*d* of FIG. 2 is revealed. However, future events might cause authorization code 165 to be revoked, such as a suspected compromise of authorization code 165 by a third party. In this case, an administrator might instruct authentication server 120 to instantly revoke authorization code 165, revealing display 255*b* of FIG. 2. Or, if James reaches the maximum number of activated media players assigned to him, then display 255*c* of FIG. 2 might be revealed, informing James that his limit has been reached. For example, if James previously activated a media player at his home theatre and a media player at his office, an attempt to activate a third media player at his brother's home might fail, since Northern Entertainment decided to impose a uniform two player maximum limit. In this case, James might need to deactivate the media player at his office or home before viewing the movie at his brother's home. Authentication server 120 might be further configured to detect and prevent excessive activation and deactivation activity to prevent such functionality from being abused for illicit purposes. Once James successfully presents a valid authorization code 165, then media player 150 receives a valid authentication message from authentication server 120.

Referring to step 450 of flowchart 400 in FIG. 4 and secure delivery system 100 of FIG. 1, step 450 of flowchart 400 comprises media player 150 sending the valid authentication message from step 440 to content server 110 over network 130. This step is done to present valid credentials to content server 110, so that James can ultimately access protected audiovisual content 111, "The Tetrahedron." Steps 440 and 450 might also be accomplished without using media player 150 as an intermediary; that is, the valid authentication message from step 440 might be directly sent to content server 110, absolving the need for step 450. If this alternative method is used, the media player identifier from step 430 might also be sent to content server 110, providing the destination for protected audiovisual content 111.

Referring to step 460 of flowchart 400 in FIG. 4 and secure delivery system 100 of FIG. 1, step 460 of flowchart 400 comprises media player 150 retrieving protected audiovisual content 111 from content server 110 from authentication server 120 over network 130, where protected audiovisual content 111 or media content incorporates an identification information associating the media content with the user, such as watermarking the media content. As previously discussed, the retrieval may occur concurrently with playback for real-time streaming applications, or the playback step may be deferred until step 460 completes, depending on the storage capabilities of media player 150 and the needs of the user. A selection of different content might also be provided to the user, allowing several items to be accessed from a single authorization code, similar to display 255*d* in FIG. 2. If James decides to download "The Tetrahedron" to storage 154, secure screener disc 160 may instruct media player 150 to contact authentication server 120 to verify that the authorization code 165 is still valid before allowing a future playback. If authorization code 165 has been invalidated, then secure screener disc 160 may instruct media player 150 to delete "The Tetrahedron" from storage 154.

The watermark retrieved in step 460 may include perceptible and imperceptible watermarks to be overlaid on top of the video content, as previously discussed. Alternatively, the watermark might already be pre-overlaid in protected audiovisual content 111, in which case retrieving a separate watermark is not necessary. To improve security, the algorithm to generate the watermarks might change periodically or on demand, minimizing the effectiveness of watermark removal in the event the watermarks are reverse engineered.

Once media player 150 receives protected audiovisual content 111, it will need some manner of decrypting the content. For example, if protected audiovisual content 111 uses AACS for content protection, and if media player 150 also uses AACS, the decryption key for decrypting protected audiovisual content 111 should already exist on media player 150, and the problem of key sharing and distribution is already solved in advance. However, if another method of content protection is used, content server 110, authentication server 120, and media player 150 may need to negotiate encryption protocols for the decryption of protected audiovisual content 111. An additional third party trusted intermediary may also be necessary to provide security services for devices connected to network 130, since the network may be public and insecure, as in for example the Internet. In this case, a public key infrastructure (PKI) might provide the necessary support to authenticate identities and encrypt messages between devices connected to network 130.

Referring to step 470 of flowchart 400 in FIG. 4 and secure delivery system 100 of FIG. 1, step 470 of flowchart 400 comprises media player 150 playing back protected audiovisual content 111 with an overlay including a watermark, the content and watermark retrieved from step 460. Referring to FIG. 3*a*, a frame of playback may look similar to video frame 300, with video layer 370 comprising the decrypted protected audiovisual content 111, and imperceptible and perceptible watermarks 371 and 372 comprising the retrieved watermark. As previously discussed, program data 161 on secure screener disc 160 may contain BD-J code or some other mechanism for instructing media player 150 to composite video frames similar to video frame 300 on the fly. If in step 460, the watermark compositing was done in advance, protected audiovisual content 111 will already have imperceptible watermark 371 and perceptible watermark 372 integrated within video layer 370, and therefore media player 150 will not be required to further process the video stream. Thus, after step 470 is completed, James is enabled to view "The Tetrahedron" for his consideration in the film contest, with the perceptible watermark reminding James of his legal obligations, and the imperceptible watermark providing a measure of insurance for Northern Entertainment in the event James decides to ignore those obligations.

As part of the advantages of various embodiments of the present invention, content producers are enabled to distribute secure contents on secure screener discs, or other means, to advance audiences in a cost-efficient, protected, and revocable manner, thus conserving fiscal resources, deterring casual copying of protected materials, and providing a contingency plan if a content leak occurs. In one embodiment, since physical media with customized data for each recipient no longer needs to be created, distribution of generic screener discs can leverage cost-effective mass production techniques used for commercial media. Similarly, since standard content formats and media in widespread adoption by industry and consumers can be utilized, playback and distribution can be easily accomplished using commodity hardware widely available in retail channels. Aided by network connectivity, such standards compliant hardware can insert unique watermarks for each recipient, providing an effective deterrent against casual illicit distribution. Damaging content leaks can be controlled early simply by instantly revoking the associated authorization codes, preventing isolated incidents from snowballing into full disasters. Additionally, the presence of imperceptible watermarks within leaked materials may provide valuable forensic evidence for determining the leak sources.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a media player to provide access to an audiovisual content, the method comprising:
   receiving a request from a person for playing the audiovisual content;
   prompting the person for an authorization code in response to the receiving of the request for playing the audiovisual content;
   receiving the authorization code from the person in response to the prompting of the person;
   transmitting the authorization code and a media player identifier to an authentication server over a network in response to the receiving of the authorization code;
   receiving, in response to a validation of both the authorization code and the media player identifier by the authentication server, a valid authentication message and an identification information from the authentication server over the network, wherein the identification information identifies the person associated with the audiovisual content;
   transmitting the valid authentication message received from the authentication server to a content server over the network;
   retrieving, from the content server over the network and after the transmitting of the valid authentication message, the audiovisual content; and
   playing, by the media player on a display, the audiovisual content received from the content server and a watermark, wherein the watermark includes the identification information received from the authentication server,
   wherein the valid authentication message from the authentication server is received if a maximum number of allowable media players associated with the person is not exceeded.

2. The method of claim 1, wherein the identification information is played as a machine perceptible and human imperceptible watermark.

3. The method of claim 1, wherein the request is initiated using a disc not containing the audiovisual content, wherein the disc allows access to the content server.

4. The method of claim 1, wherein the identification information is played as a human perceptible watermark by the media player.

5. The method of claim 1, wherein the watermark includes a human perceptible video overlay showing a name of the person.

6. The method of claim 1, wherein the media player identifier includes a serial number of the media player.

7. The method of claim 1, wherein a revocation of the authorization code by the authentication server prevents the media player from receiving the valid authentication message.

8. A media player for providing access to an audiovisual content, the media player comprising:
   a processor configured to:
      receive a request from a person for playing the audiovisual content;
      prompt the person for an authorization code in response to receiving the request for playing the audiovisual content;
      receive the authorization code from the person in response to prompting the person;
      transmit the authorization code and a media player identifier to an authentication server over a network in response to receiving the authorization code;
      receive, in response to a validation of both the authorization code and the media player identifier by the authentication server, a valid authentication message and an identification information from the authentication server over the network, wherein the identification information identifies the person associated with the audiovisual content;
      transmit the valid authentication message received from the authentication server to a content server over the network;
      retrieve, from the content server over the network and after transmitting the valid authentication message, the audiovisual content; and
      play, on a display, the audiovisual content received from the content server and a watermark, wherein the watermark includes the identification information received from the authentication server,
      wherein the valid authentication message from the authentication server is received if a maximum number of allowable media players associated with the person is not exceeded.

9. The media player of claim 8, wherein the identification information is played as a machine perceptible and human imperceptible watermark by the media player.

10. The media player of claim 8, wherein the request is initiated using a disc not containing the audiovisual content, wherein the disc allows access to the content server.

11. The media player of claim 8, wherein the identification information is played as a human perceptible watermark by the media player.

12. The media player of claim 8, wherein the watermark includes a human perceptible video overlay showing a name of the person.

13. The media player of claim 8, wherein the media player identifier includes a serial number of the media player.

14. The media player of claim 8, wherein a revocation of the authorization code by the authentication server prevents the media player from receiving the valid authentication message.

15. A non-transitory computer storage medium embodying a program code for execution by a processor of a media player, the program code comprising:

code for receiving a request from a person for playing the audiovisual content;

code for prompting the person for an authorization code in response to the receiving of the request for playing the audiovisual content;

receiving the authorization code from the person in response to the prompting of the person;

code for transmitting the authorization code and a media player identifier to an authentication server over a network in response to the receiving of the authorization code;

code for receiving, in response to a validation of both the authorization code and the media player identifier by the authentication server, a valid authentication message and an identification information from the authentication server over the network, wherein the identification information identifies the person associated with the audiovisual content;

code for transmitting the valid authentication message received from the authentication server to a content server over the network;

code for retrieving, from the content server over the network and after the transmitting of the valid authentication message, the audiovisual content; and playing, by the media player on a display, the audiovisual content received from the content server and a watermark, wherein the watermark includes the identification information received from the authentication server, wherein the valid authentication message from the authentication server is received if a maximum number of allowable media players associated with the person is not exceeded.

16. The non-transitory computer storage medium of claim 15, wherein the identification information is played as a machine perceptible or a human perceptible watermark by the media player.

17. The non-transitory computer storage medium of claim 15, wherein the request is initiated using a disc not containing the audiovisual content, wherein the disc allows access to the content server.

18. The non-transitory computer storage medium of claim 15, wherein the media player identifier includes a serial number of the media player.

\* \* \* \* \*